UNITED STATES PATENT OFFICE.

ARNOLD C. VON HAGEN, OF KANSAS CITY, MISSOURI.

PROCESS OF CLEANING WHEAT AND OTHER GRAINS.

1,221,636. Specification of Letters Patent. Patented Apr. 3, 1917.

No Drawing. Application filed March 3, 1916. Serial No. 81,799.

*To all whom it may concern:*

Be it known that I, ARNOLD C. VON HAGEN, a citizen of the United States, residing in Kansas City, in the county of Jackson and State of Missouri, have invented new and useful Improvements in Processes of Cleaning Wheat and other Grains, of which the following is a specification.

This invention relates to an improved process for cleaning and otherwise purifying grain, such as wheat, corn, rye, oats, and the like, and has particular reference to a process for this purpose involving the use of an alkaline substance.

Heretofore a process for cleaning and purifying grain known as the "dry process" has gone into quite extensive use. This process provides for the application to the grain of finely powdered lime, or other dry alkaline substance while the grain is undergoing mutual attrition in an advancing mass. Such application of the powdered alkaline material to the grain tends to absorb or dry any oil or oily substance present on the grain, and to counteract the propensity of any such oily foreign substance to adhere to the coating of the wheat, the idea being that after having neutralized, or dried, such oil and removed any foreign substance, such as smut, which in itself is a greasy, water-resisting substance, the grain is placed in a more favorable condition for proper tempering and its permeation by water when preparing it for milling.

I have discovered that very superior results are obtained by practising the cleansing process with an alkaline substance in the presence of moisture, and that what may thus be called a "wet" process, as distinguished from the process above briefly referred to, possesses greater advantages than obtain when treating the grain with a dry powdered alkaline substance.

While my process may be utilized in cleaning grain of all descriptions, it is intended particularly for cleaning and purifying wheat, and I will describe its application in that connection without, however, intending to limit the use of the process to the treatment of wheat.

According to my process, therefore, an alkaline substance, preferably lime, although soda or other alkali may be used, is applied to the wheat in presence of moisture but with the lime in excess. The alkali, in powdered form, may be applied to the wheat while the latter is undergoing mutual attrition in an advancing mass, as heretofore practised, and then the wheat be subjected to moisture; or the powdered alkali may be mixed with the wheat simultaneously with the application of moisture thereto; or, finally, the wheat may be first moistened and then the alkaline substance applied thereto. Under any circumstances, the essential idea in connection with my process is to obtain the action of moist lime or other alkali upon the grain, which, as stated, I find to be more beneficial than the action of the dry alkali.

Under any form of practising my invention the moisture or water leaves a portion of the alkali undissolved and allows of its application in a moist condition to the surface of the grain, so that the lime itself in all cases will be applied to the grain. In my method the moisture operates as a vehicle or medium to effect an intimate contact with the surface of the berry, and carries the free lime with it in doing so. In one aspect of the invention the excess lime in the solution may be considered as being in a very favorable state for exerting its properties, that is, it is in a free state somewhat analogous to the nascent state of a freed element. It is most energetic in its action to coat the pellicles of the grain to dissolve the impurities on the surface of the grain. I do not permit a disintegrating action by the lime of the outer pellicle of the grain. In other words, the action of the lime expends itself in merely removing the impurities adhering to the exterior of the grain. Contributing to this result is the fact that I employ a relatively small quantity of lime as compared with the quantity of grain.

The quantity of lime or other alkaline powder used in practising my process may be varied from one-eighth of an ounce per bushel of wheat, which would result in the application of a trace of lime to each grain, to two or three ounces per bushel of wheat, which would result in the application of a considerable amount of lime to each grain, the amount of alkali used depending on the character of the grain and the extent of its infection with must, smut, or other disease or impurities.

I wish it understood that by referring to moistening the grain or the lime I reserve the right to use water or steam.

My process may be applied to grain, either before or after it is cleaned by the use of the ordinary machines for this purpose, but under any circumstances, after the treatment by my process the grain is run into a suitable machine, such as a peeler, scourer, brusher, aspirator, or washer, to remove the lime, or other alkali, with the material adhering to or absorbed thereby.

The application of the alkali to the grain is made during such time as the grain is being agitated and continuously advanced, or, as otherwise stated herein, while the grain pellicles are undergoing rubbing against each other, that is, while they are subjected to mutual attrition in an advancing mass.

I claim:

1. The process of treating wheat or other grain which consists in adding powdered alkali thereto, then moistening to partially dissolve the alkali while in contact with the grain, and finally treating the grain to remove the alkali with the material adhering to or absorbed thereby.

2. The process of treating wheat or other grain which consists in adding powdered lime thereto, then moistening to partially dissolve the lime while in contact with the grain, and finally treating the grain to remove the lime with the material adhering to or absorbed thereby.

3. The process of treating wheat or other grain which consists in adding a dry alkali and moisture thereto, the moisture operating to partially dissolve the alkali, and then treating the grain to remove the alkali with the material adhering to or absorbed thereby.

4. The process of treating grain which consists in subjecting the grain to the action of a dry alkali in the presence of a quantity of liquid insufficient to dissolve the alkali and applied to the grain separately from the alkali, said liquid operating to moisten the alkali, and bring the same into intimate contact with the surface of the grain.

In testimony whereof, I have hereunto set my hand.

ARNOLD C. VON HAGEN.

Copies of this patent may be obtained for five cents each, by addressing the "Commissioner of Patents, Washington, D. C."